United States Patent
Van Kerrebroeck et al.

(10) Patent No.: US 10,659,455 B2
(45) Date of Patent: *May 19, 2020

(54) SELF-AUTHENTICATING CHIPS

(71) Applicant: CARDEX SYSTEMS INC., Toronto (CA)

(72) Inventors: Dennis Bernard Van Kerrebroeck, Toronto (CA); Craig Michael Horn, London (GB); Bernard Marie-Andre Van Kerrebroeck, Toronto (CA)

(73) Assignee: CARDEX SYSTEMS INC., Toronto, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,808

(22) Filed: Oct. 15, 2018

(65) Prior Publication Data

US 2019/0260738 A1 Aug. 22, 2019

Related U.S. Application Data

(63) Continuation of application No. 15/382,154, filed on Dec. 16, 2016, now Pat. No. 10,135,814, which is a (Continued)

(51) Int. Cl.
*H04L 29/06* (2006.01)
*H04W 4/80* (2018.01)
(Continued)

(52) U.S. Cl.
CPC .......... *H04L 63/0853* (2013.01); *G06F 21/44* (2013.01); *G06F 21/57* (2013.01);
(Continued)

(58) Field of Classification Search
CPC ... H04L 63/0853; G07F 7/0833; G07F 7/1008
(Continued)

(56) References Cited

U.S. PATENT DOCUMENTS

| 4,614,861 A | 9/1986 | Pavlov et al. |
| 5,623,552 A | 4/1997 | Lane |

(Continued)

FOREIGN PATENT DOCUMENTS

| CN | 101667915 | 3/2010 |
| WO | 96/02901 A1 | 2/1996 |

(Continued)

OTHER PUBLICATIONS

International Search Report and Written Opinion dated Jul. 8, 2015 in relation to PCT Application No. PCT/CA/2015/050286, filed on Apr. 8, 2015.

(Continued)

*Primary Examiner* — Teshome Hailu

(57) ABSTRACT

A self-authenticating chip includes first and second memory regions storing, respectively, first and second authentication codes. The second memory region is adapted to be unreadable and unmodifiable by the chip or a chip reader. The chip also includes a comparator for providing an indicator of whether given input matches the second authentication code. The chip also includes an authentication circuit that is operable to read the first authentication code from the first memory region, present the first authentication code to the comparator, and in response to receiving an indicator from the comparator indicating that the first and second authentication codes match, unlock at least one of (i) a communication interface of the chip to allow data to be transmitted therethrough to a chip reader and (ii) a third memory region of the chip to allow data to be read therefrom.

16 Claims, 16 Drawing Sheets

Related U.S. Application Data continuation of application No. 14/249,244, filed on Apr. 9, 2014, now Pat. No. 9,590,983.

(51) Int. Cl.
| | | |
|---|---|---|
| *H04W 12/06* | (2009.01) | |
| *G06F 21/44* | (2013.01) | |
| *G06F 21/57* | (2013.01) | |
| *G06F 21/77* | (2013.01) | |
| *G06Q 20/32* | (2012.01) | |
| *G07F 7/08* | (2006.01) | |
| *G06Q 20/34* | (2012.01) | |

(52) U.S. Cl.
CPC ......... *G06F 21/77* (2013.01); *G06Q 20/3229* (2013.01); *G06Q 20/357* (2013.01); *G07F 7/0826* (2013.01); *G07F 7/0833* (2013.01); *H04W 4/80* (2018.02); *H04W 12/06* (2013.01); *G06Q 20/32* (2013.01)

(58) Field of Classification Search
USPC .......................................................... 726/7
See application file for complete search history.

(56) References Cited

U.S. PATENT DOCUMENTS

| | | | |
|---|---|---|---|
| 5,786,587 | A | 7/1998 | Colgate, Jr. |
| 6,223,290 | B1 | 4/2001 | Larsen et al. |
| 7,044,394 | B2 | 5/2006 | Brown |
| 7,591,427 | B2 | 9/2009 | Osterweil |
| 8,051,263 | B2 | 11/2011 | Renno |
| 2002/0072963 | A1* | 6/2002 | Jonge ............... G07B 15/02 705/13 |
| 2006/0091223 | A1* | 5/2006 | Zellner ........... G06K 19/06206 235/492 |
| 2006/0212679 | A1 | 9/2006 | Alfano et al. |
| 2006/0219776 | A1* | 10/2006 | Finn ................. B60R 25/25 235/380 |
| 2008/0110977 | A1 | 5/2008 | Bonalle et al. |
| 2008/0126262 | A1 | 5/2008 | Brady et al. |
| 2009/0158445 | A1 | 6/2009 | Dewar |
| 2010/0140344 | A1 | 6/2010 | Toofan et al. |
| 2010/0165562 | A1* | 7/2010 | Segaram ............ G06F 1/185 361/679.31 |
| 2010/0230487 | A1 | 9/2010 | Johnson et al. |
| 2010/0237146 | A1 | 9/2010 | Turner |
| 2010/0332393 | A1* | 12/2010 | Weller ............... G06Q 20/02 705/44 |
| 2012/0226600 | A1 | 9/2012 | Dolev |
| 2012/0318871 | A1 | 12/2012 | Mullen et al. |
| 2013/0054961 | A1 | 2/2013 | Kato et al. |
| 2013/0263229 | A1* | 10/2013 | Sugahara ........... H04W 12/06 726/4 |
| 2014/0165141 | A1 | 6/2014 | Chellappa et al. |

FOREIGN PATENT DOCUMENTS

| | | |
|---|---|---|
| WO | 0159686 | 8/2001 |
| WO | 2012/122994 A1 | 9/2012 |
| WO | 2004/095169 | 11/2014 |

OTHER PUBLICATIONS

International Search Report and Written Opinion dated Jun. 17, 2015 in relation to PCT Application No. PCT/CA2015/050287, filed on Apr. 8, 2015.

USPTO, Office Action Communication, dated Sep. 21, 2015, in U.S. Appl. No. 14/249,244, 24 pages.

USPTO, Office Action Communication, dated May 19, 2015, in U.S. Appl. No. 14/249,244, 23 pages.

USPTO, Notice of Allowance Communication, dated Feb. 13, 2017, in U.S. Appl. No. 14/249,244, 2 pages.

European Extended Search dated Oct. 19, 2017, in relation to European Patent Application No. 15776329.3, filed Apr. 8, 2015.

Sibylle Hick et al, "Technical Guidelines for the Secure Use of RDIF (TG RFID)", Jan. 1, 2010. Retrieved from Internet: URL: https://www.bsi.bund.de/SharedDocs/Downloads/EN/BSI/Publications/TechGuidelines/TG03126/TG_03162_5_Application_area_Electronic_Employee_ID_Card.pdf?_blob=oublicationFile&v=1.

First Notification of Office Action dated Oct. 29, 2018, in relation to Chinese Patent Application No. 201580027873.4, filed Apr. 8, 2015.

\* cited by examiner

SELF-AUTHENTICATING CHIPS

CROSS-REFERENCE TO RELATED APPLICATION

This application is a continuation of U.S. patent application Ser. No. 15/382,154 filed Dec. 16, 2016, which application is a continuation of U.S. patent application Ser. No. 14/249,244, filed Apr. 9, 2014, the entire contents of the prior applications are hereby incorporated herein by reference.

TECHNICAL FIELD

This relates to microchips, and more particularly to self-authenticating microchips for inclusion in devices to protect against counterfeiting of such devices.

BACKGROUND

Each year, billions of dollars are lost worldwide to payment card fraud. Commonly; card data (e.g., credit/debit card account number, expiry date, etc.) are copied by fraudsters to create counterfeit cards that are used to conduct fraudulent transactions. For example, card data stored on a card's magnetic stripe may be copied when an unwitting user swipes the card in a compromised merchant point-of-sale (POS) terminal. Further, the proliferation of Internet use and e-commerce has created new opportunities for card data to fall into unscrupulous hands.

Some technological advances have been made in recent years to combat counterfeiting of payment cards. For example, card issuers have introduced so-called "smart cards" that rely on embedded integrated circuits or microchips (hereinafter referred to as "smart chips" or "chips") to provide certain security features. For example, smart cards may be configured to require user authentication (e.g., by entry of a secret numerical code) at the time of each transaction. Further, smart cards may be configured to communicate card data to merchant POS terminals in encrypted form to prevent that data from being copied. However, sophisticated fraudsters have discovered ways to replicate smart cards while circumventing the requirement for user authentication.

In recent years, counterfeiting of subscriber identity module (SIM) cards for mobile telephony devices has also emerged as a serious problem. Counterfeit SIM cards have been used by fraudsters to gain fraudulent access to mobile networks, and have also been used by criminals to commit crimes under fake or assumed identities. Conventional SIM cards include a number of security features to prevent counterfeiting. For example, conventional SIM cards include integrated circuits (chips) that store a secret key used to authenticate the SIM card to a mobile network. However, as is the case with smart cards, sophisticated fraudsters have discovered ways to replicate conventional SIM cards while circumventing their security features.

Accordingly, there is a need for improved protection against counterfeiting.

SUMMARY

According to an aspect, there is provided a self-authenticating chip. The chip includes a first memory region storing a first authentication code; a second memory region storing a second authentication code, the second memory region adapted to be unreadable and unmodifiable by the chip or a chip reader; a comparator interconnected to the second memory region for providing an indicator of whether given input matches the second authentication code; and an authentication circuit interconnected to the comparator and the first memory region. The authentication circuit is operable to: read the first authentication code from the first memory region; present the first authentication code to the comparator; and in response to receiving an indicator from the comparator indicating that the first authentication code matches the second authentication code: unlock at least one of (i) a communication interface of the chip to allow data to be transmitted therethrough to a chip reader and (ii) a third memory region of the chip to allow data to be read therefrom.

According to other aspects there is provided a card, a document, an electronic device, and a vehicle, each including a self-authenticating chip as disclosed herein.

According to another aspect, there is provided a self-authenticating card comprising: a first chip having a first memory region storing a first authentication code, and a communication interface for communicating with a chip reader; and a second chip having a second memory region storing a second authentication code. At least one of the first and second chips provides an authentication circuit interconnected with the first memory region and the second memory region, the authentication circuit operable to: read the first authentication code from the first memory region; read the second authentication code from the second memory region; authenticate the card by comparing the first authentication code with the second authentication code; and upon the authenticating: unlock at least one of (i) the communication interface to allow data to be transmitted therethrough (ii) a third memory region to allow data to be read therefrom.

According to a further aspect, there is provided an authentication system comprising: a self-authenticating chip as described herein or a self-authenticating card as described herein, and a computing device. The computing device includes a radio-frequency receiver, a network communication interface, at least one processor, and memory interconnected to the at least one processor. The memory stores software code that, upon execution by the at least one processor, causes the computing device to: receive a network authentication code from the self-authenticating chip or the first chip of the self-authenticating card, by way of the radio-frequency receiver; and transmit the network authentication code to a network-interconnected authentication server by way of the network communication interface.

Other features will become apparent from the drawings in conjunction with the following description.

BRIEF DESCRIPTION OF THE DRAWINGS

In the figures which illustrate example embodiments.

DETAILED DESCRIPTION

Figure 1:
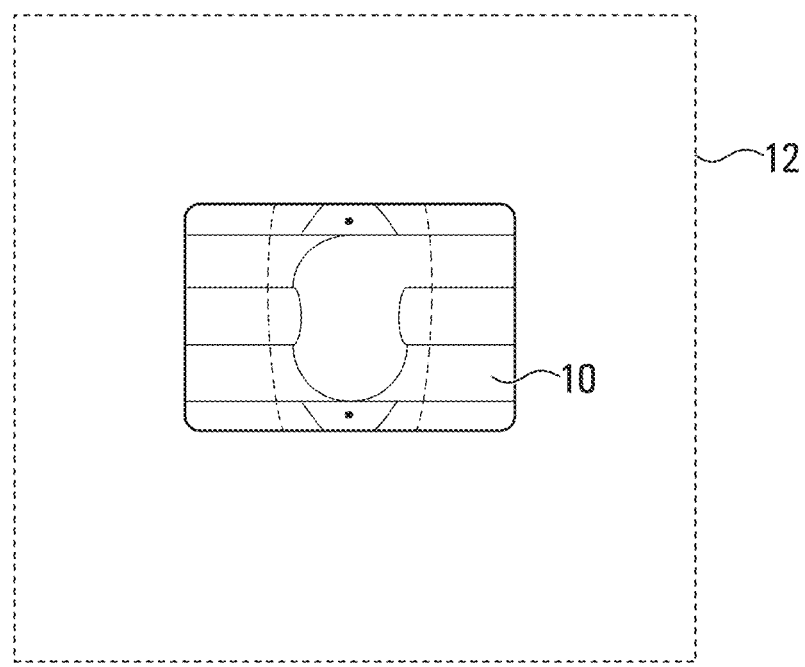
FIG. 1 is a schematic diagram of a device including a self-authenticating chip, exemplary of an embodiment.

FIG. 1 depicts a self-authenticating chip 10 exemplary of an embodiment. As will become apparent, chip 10 performs authentication operations to verify its authenticity. As will also become apparent, when chip 10 is included in a device such as device 12, chip 10 may be used to verify the authenticity of the device, and thereby protect against counterfeiting of the device. For example, chip 10 may be included in a payment card to verify the authenticity of the payment card when used to conduct a transaction. Self-authenticating chips as discussed herein may also be included in other types of devices such as, for example, SIM cards, identity cards or documents, electronic appliances, and vehicles, as further discussed below.

Figure 2:
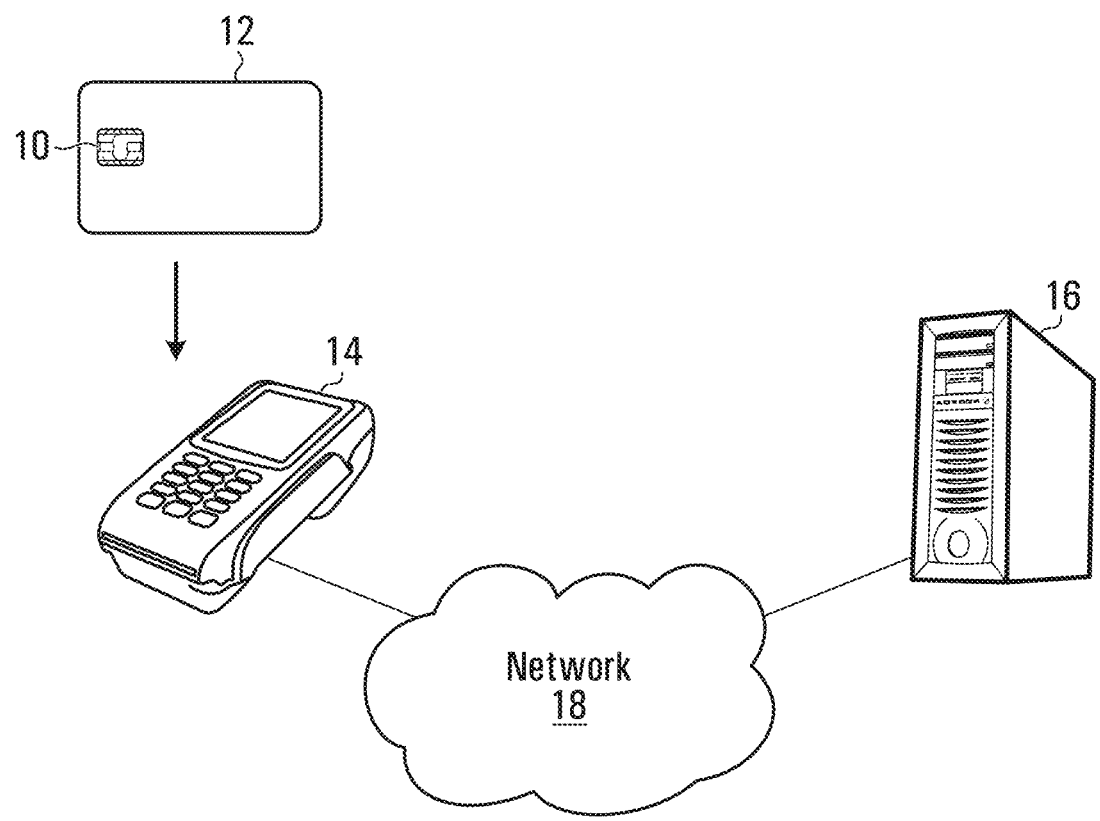
FIG. 2 is a network diagram illustrating a data communication network interconnecting a merchant POS terminal and a remote server, and a payment card including the self-authenticating chip of FIG. 1.

FIG. 2 depicts a device 12 that is a payment card (hereinafter referred to as card 12). As depicted, card 12 is presented to a merchant POS terminal 14 to conduct a transaction (e.g., a credit card or debit card transaction). Presenting card 12 to terminal 14 causes chip 10 of card 12 to perform authentication operations, as detailed below. The transaction is allowed to proceed only if the authenticity of card 12 is verified upon performing these authentication operations.

An example merchant POS terminal 14 is illustrated. Terminal 14 may be a conventional device, as produced by, e.g., VeriFone, Hypercom, or Ingenico, and is operated in manners detailed below. Terminal 14 is typically located at a merchant's premises and is used to conduct payment card transactions (e.g., credit card or debit card transactions) between a merchant and a card bearer. As detailed below, when a transaction is conducted, terminal 14 obtains card data from a card (e.g., card 12) and transmits this data to a remote server 16. To this end, terminal 14 is configured to communicate with card 12, as well as network-interconnected server 16.

In the depicted embodiment, terminal 14 includes an LCD display for displaying information to a user, a keypad for receiving user input, a slot through which the magnetic stripe of a card (e.g., card 12) can be swiped to allow terminal 14 to read from that stripe, a slot for receiving a card with a smart chip to allow terminal 14 to communicate with that smart chip by way of the chip's contact pins, a radio-frequency (RF) interface to allow terminal 14 to communicate with the smart chip by way of RF signals, and a network interface to allow terminal 14 to communicate with a remote server by way a data network.

An example server 16 is illustrated. Server 16 may be a conventional server-class computing device adapted to service requests to process payment card transactions (e.g., credit card or debit card transactions). Server 16 is typically operated by the issuer of the payment card or a delegate of the issuer.

The architecture of server 16 is not specifically illustrated. Server 16 may include one or more processors, memory, and a network interface to allow server 16 to communicate with network-interconnected merchant POS terminals (e.g., terminal 14). Server 16 may store and execute a network-aware server operating system (e.g., Unix, Linux, Windows Server, or the like). Server 16 may be in communication with one or more databases storing credit card data and card bearer data.

As illustrated, terminal 14 and server 16 are interconnected by data network 18. Data network 18 may include any combination of wired and wireless links capable of carrying packet-switched traffic. For example, these links may include links of a cellular data network (e.g., a GPRS or LTE network) and/or the public Internet.

Figure 3A:
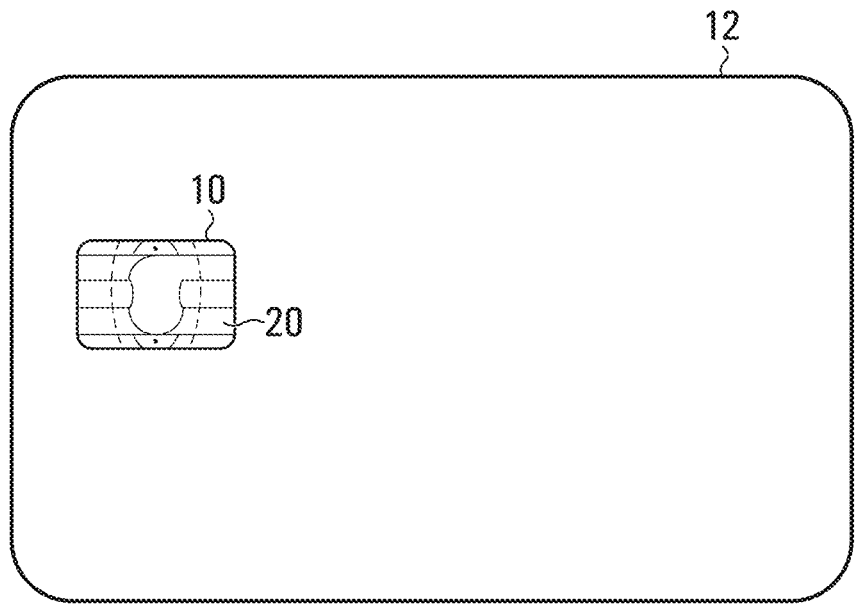
FIG. 3A and FIG. 3B are front and rear views, respectively, of the card of FIG. 2.
Figure 3B:
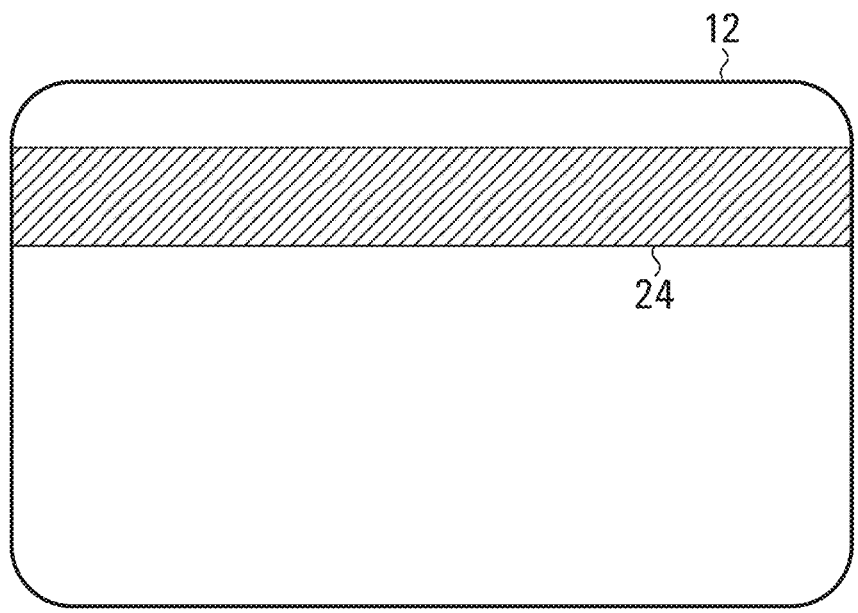

FIG. 3A and FIG. 3B respectively depict the front and rear of card 12. As depicted, the exterior of card 12 is similar to a conventional smart card. In particular, card 12 has plastic front and rear surfaces, with contact pins 20 of chip 10 exposed on its front surface and magnetic stripe 24 affixed to its rear surface. In some embodiments, the front surface of card 12 may also include additional features such as, e.g., the card bearer's name, the card's account number, and the card's expiry date, printed or embossed thereon. Similarly, in some embodiments, the rear surface of card 12 may also include additional features such as, e.g., a security code or a signature panel.

In the depicted embodiment, card 12 is dimensioned to be readily carried by a user (e.g., in a wallet). For example, card 12 may have dimensions that accord with published international standards such as ISO/IEC 7810. In embodiments that conform to the ID-1 format defined by the ISO/IEC 7810 standard, card 12 has a width of approximately 85.60 mm, a height of approximately 53.98 mm, and a thickness of approximately 0.76 mm. The dimensions of card 12 (e.g., thickness, width, and height) may vary in other embodiments. Card 12 may be formed to have other physical characteristics (e.g., flammability, toxicity, stiffness, durability, etc.) that accord with the ISO/IEC 7810 standard.

As depicted in FIG. 3B, card 12 includes magnetic stripe 24 storing data readable by a magnetic-stripe reader. Magnetic stripe 24 may be a conventional magnetic stripe storing data readable by a conventional magnetic stripe reader (e.g., of merchant POS terminal 14). As such, magnetic stripe 24 may store data in a plurality of bits positions, where each bit position can be set to a value of 0 or 1 by altering the state of magnetic domains at that bit position. In some embodiments, magnetic stripe 24 may store data in a format that accords with published international standards such as ISO/IEC 7811. So, magnetic stripe 24 may be organized to store data in three separate data tracks, namely, track 1, track 2, and track 3. When it is unnecessary for card 12 to provide data to a magnetic stripe reader, magnetic stripe 24 may be omitted.

Figure 3C:
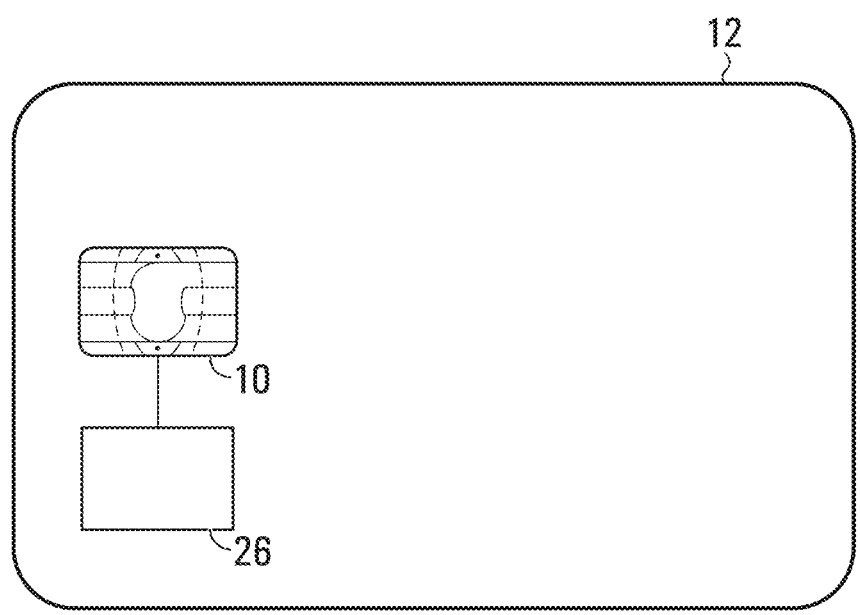
FIG. 3C is a schematic diagram of components of the card of FIG. 2.

FIG. 3C schematically illustrates components of card 12, exemplary of an embodiment. As shown, card 12 includes chip 10, and optionally, may also include an embedded power supply 26 connected to chip 10. Chip 10 may be a conventional smart chip, such as, for example, a Siemens SLE4442 chip. Chip 10 includes logic adapting it to perform authentication operations in manners detailed below. Power supply 26 supplies power to card 12, allowing card 12 to be operated when it cannot draw power from an external source, e.g., from a merchant POS terminal by way of contact pins 20. In an embodiment, power supply 26 may include a thin, flexible lithium polymer battery, as manufactured by, for example, Solicore of Lakeland, Fla.

Figure 4:
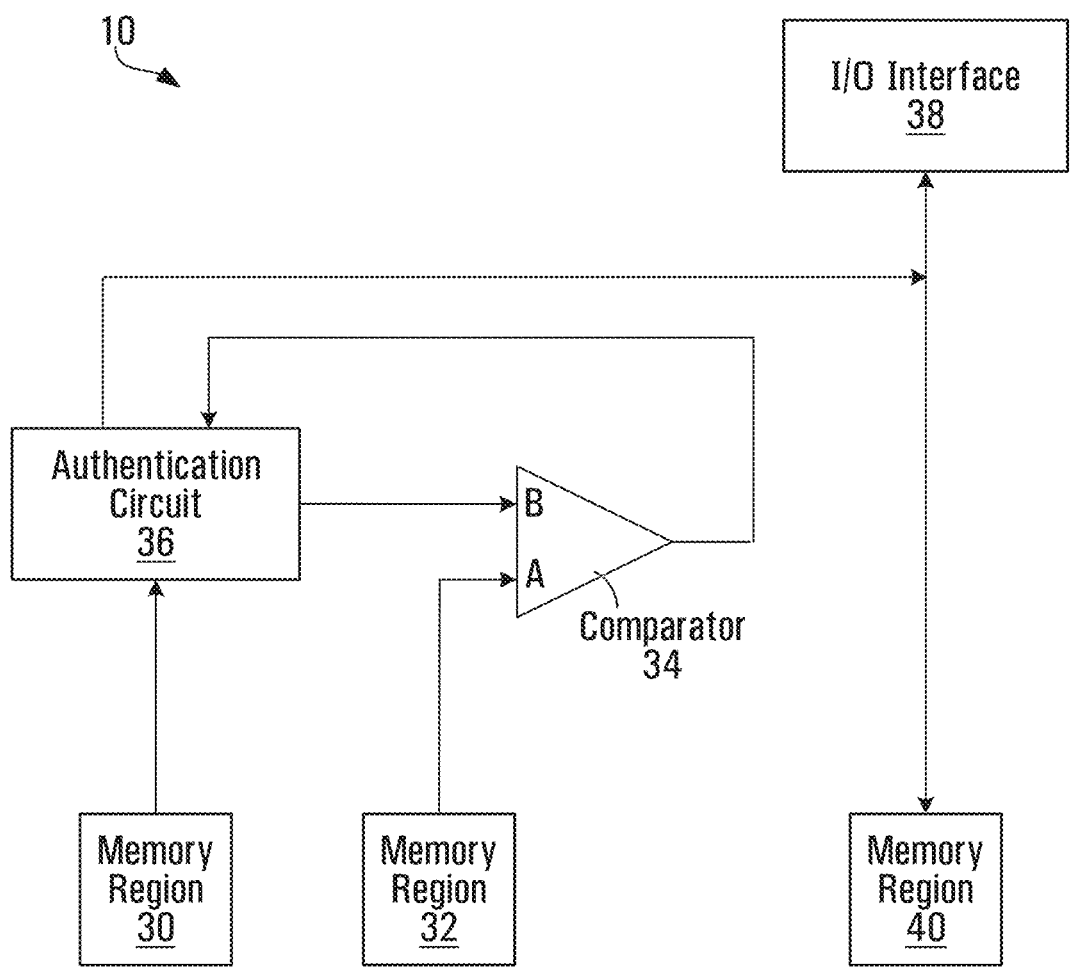
FIG. 4 is a simplified block diagram of the chip of FIG. 1.

FIG. 4 is a simplified block diagram of chip 10, exemplary of an embodiment. As depicted, chip 10 includes an authentication circuit 36 that includes logic for performing authentication operations. In particular, authentication circuit 36 includes logic for performing authentication by chip 10 itself, hereinafter referred to as "self-authentication". In some embodiments, authentication circuit 36 may also include logic for performing authentication in cooperation with a network-interconnected server (e.g., server 16), hereinafter referred to as "network authentication." The logic of authentication circuit 36 may be implemented using a combination of hardware and software components, including, e.g., software code stored in EEPROM.

Chip 10 also includes memory regions 30 and 32, which each store data, i.e., authentication codes, used to perform the aforementioned self-authentication. Memory region 30 is interconnected with authentication circuit 36 such that data stored in memory region 30 may be read therefrom by authentication circuit 36. Memory region 30 may be a region in any memory of chip 10 that may be read by authentication circuit 36, e.g., EEPROM or ROM. In other embodiments, memory region 30 may be a region in a memory external to chip 10.

Memory region 32 is a protected memory region that is adapted to be unreadable and unmodifiable by chip 10 or a chip reader. Memory region 32 is interconnected with comparator 34 such that data stored in memory region 32 is presented to input A of comparator 34. Data written to memory region 32 can only be accessed by presenting data to input B of comparator 34, which outputs a binary indicator of whether data at input A matches data at input B. In embodiments in which chip 10 is a Siemens SLE4442 chip, memory region 32 may be located in the Manufacturer's Code partition of this Siemens chip.

As depicted, chip 10 also includes an I/O interface 38 that allows chip 10 to communicate with a chip reader such as a merchant POS terminal, a computing device as described below, or other devices adapted to communicate with a conventional smart card (collectively, "chip readers" or "card readers"). In particular, interface 38 allows chip 10 to communicate with a chip reader by way of contact pins 20. Optionally, interface 38 may also allow chip 10 to communicate with a chip reader by way of RF signals. To facilitate RF communication, interface 38 may include an RF transmitter and an RF receiver, interconnected with an RF antenna embedded in card 12 (not shown). In some embodiments, such RF communication may adhere to the near field communication (NFC) protocol.

Interface 38 may be selectively lockable to prevent data from being communicated therethrough from chip 10 to a chip reader (e.g., terminal 14). For example, when chip 10 is included in payment card 12, locking interface 38 may prevent payment card account data to be transmitted to a chip reader before chip 10 has verified its authenticity. Interface 38 may be locked, for example, by disabling a RF transmitter of chip 10 and/or disabling one or more pins of contact pins 20. Interface 38 may be toggled between locked and unlocked states in response to a signal, e.g., sent by authentication circuit 36.

Optionally, chip 10 may also include a memory region 40 that stores data to be provided to a chip reader after chip 10 performs self-authentication. As depicted, memory region 40 is interconnected with authentication circuit 36. In some embodiments, memory region 40 may be formed in selectively lockable memory as disclosed, for example, in U.S. Pat. No. 8,051,263 to Renno. Memory region 40 may be toggled between locked and unlocked states in response to a signal, e.g., sent by authentication circuit 36. When memory region 40 is locked, access to data stored therein is disabled. For example, when chip 10 is included in payment card 12 and payment card account data is stored in memory region 40, locking memory region 40 prevents that data from being read from memory region 40 and transmitted from chip 10 before chip 10 has verified its authenticity.

When chip 10 is included in a device that is a payment card (e.g., card 12), chip 10 may also include other components of a conventional payment card smart chip, which are not shown in FIG. 4 or detailed herein.

Figure 5A:
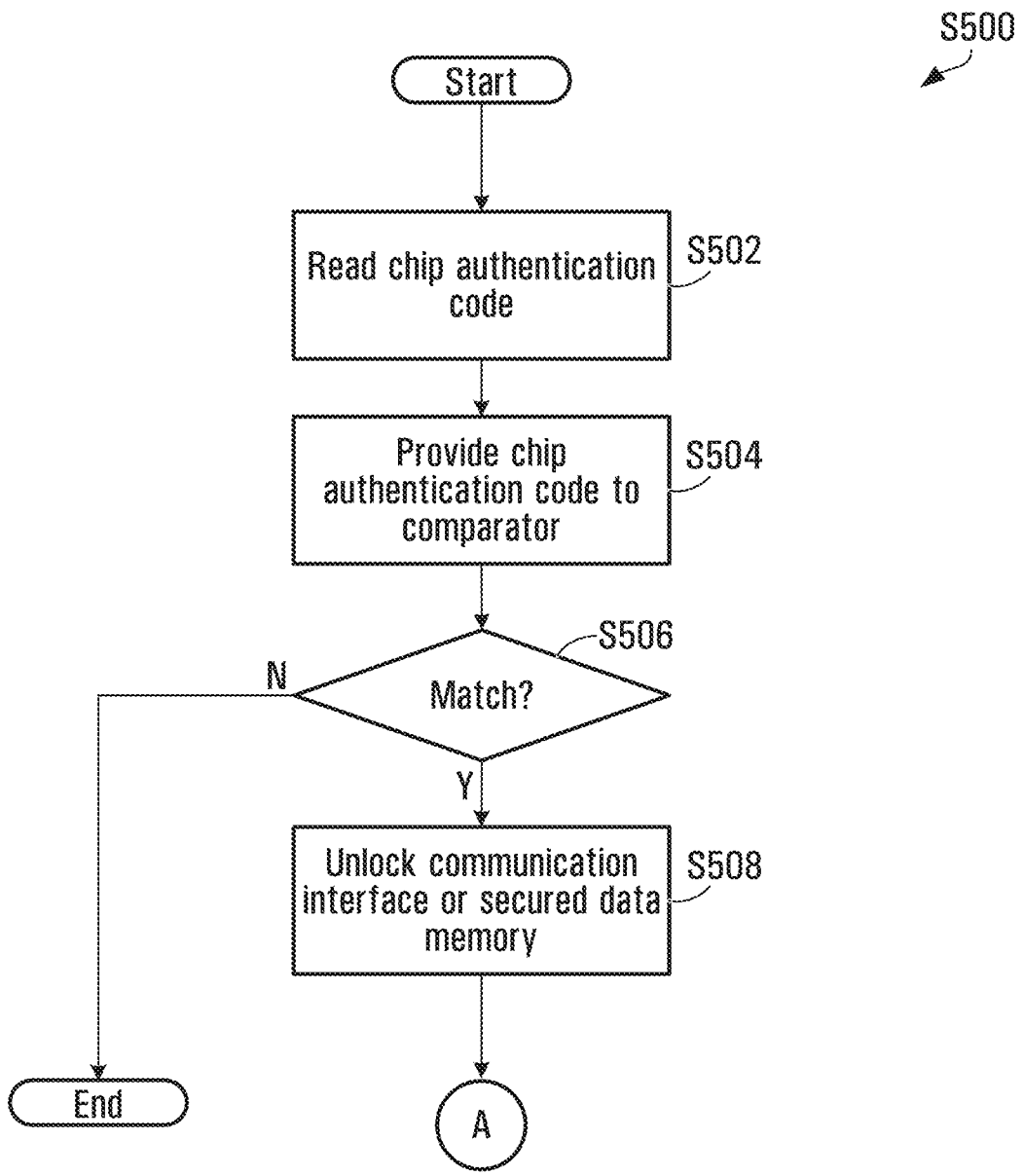
FIGS. 5A-C are flowcharts depicting exemplary blocks performed by the chip of FIG. 1.
Figure 5B:
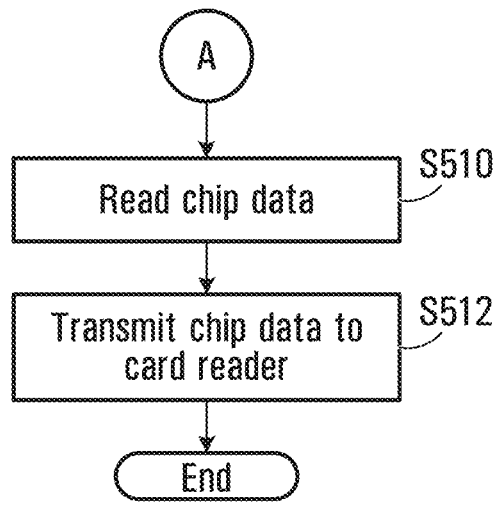

FIG. 5A and FIG. 5B depict exemplary operations performed by chip 10 during self-authentication. As will be detailed below with reference to blocks S500 and onward, chip 10 performs self-authentication by comparing a first chip authentication code stored at a first location on chip 10 with a second chip authentication code stored at a second location on chip 10. Chip 10 is verified to be authentic only if these two codes match. In some embodiments, the first and second chip authentication codes may be identical. In other embodiments, these codes may be related by a defined relationship (e.g., a hash function), allowing the codes to be matched according to the defined relationship.

The chip authentication codes may be assigned to chip 10 at time of manufacture, and may be unique to chip 10. When chip 10 is included in a device (e.g., card 12), that device may be deemed to be authentic when chip 10 is verified to be authentic.

Chip 10 is initialized prior to performing self-authentication. In particular, a first chip authentication code is written to a first location (e.g., protected memory region 32), and a second chip authentication code is written to a second location (e.g., memory region 30).

As noted, when a chip authentication code is written to protected memory region 32, it cannot be read or modified by chip 10 or any external reader/writer. Rather, comparator 34 must be used to compare given input to the code in protected memory region 32.

In some embodiments, the second chip authentication code may be stored in encrypted form. Conventional encryption techniques may be used for this purpose. For example, a symmetric-key encryption technique such as, e.g., AES, DES, 3DES, or the like may be used. Alternatively, an asymmetric-key encryption technique such as RSA may also be used. Other encryption techniques apparent to a person skilled in the art may also be used instead of or in conjunction with the techniques listed above. In some embodiments, customized or proprietary encryption techniques may also be used. The key(s) may be unique to chip 10.

Conveniently, when the first chip authentication code is stored in protected memory region 32 and the second chip authentication code is stored in encrypted form, the chip authentication codes cannot be read from chip 10 by a would-be fraudster, e.g., using a compromised merchant POS terminal. This prevents duplication of the chip authentication codes of chip 10. When chip 10 is included a device (e.g., card 12), this protects against counterfeiting of that device.

Furthermore, as two chip authentication codes are required to perform self-authentication, any counterfeit device that replicates only one of these codes would not be able to successfully perform self-authentication. For example, a counterfeit copy of card 12 that replicates the first chip authentication code without replicating the second chip authentication code in protected memory region 32 would not be able to successfully perform self-authentication.

During initialization, authentication circuit 36 may send lock signals to one or both of authentication circuit 36 and memory 40.

With reference to FIG. 5A, chip 10 begins performing blocks S500 and onward when a chip reader initiates communication with chip 10, e.g., when a merchant POS terminal such as terminal 14 initiates communication with chip 10 to conduct a transaction. In some embodiments, chip 10 may perform blocks S500 and onward upon receiving a signal indicating a user request to perform self-authentication.

At block S502, authentication circuit 36 reads the first chip authentication code from memory region 30. If the code is encrypted, authentication circuit 36 decrypts it. At block S504, authentication circuit 36 presents the first chip authentication code to input B of comparator 34. At the same time, the second chip authentication code stored in protected memory region 32 is presented to input A of comparator 34.

At block S506, comparator 34 determines whether the first chip authentication code presented at its input A matches the second chip authentication code presented at its input B. Comparator 34 outputs an indicator indicating whether the two codes match to authentication circuit 36. If this indicator indicates a match, then operation of chip 10 is allowed to continue. Otherwise, operation of chip 10 may be terminated. For example, when chip 10 is included in payment card 12, and self-authentication is performed prior to completing a transaction, operation of chip 10 may be terminated such that chip 10 cannot be used to complete that transaction.

As noted, interface 38 may be locked until chip 10 has verified its authenticity by performing self-authentication. Accordingly, at block S508, after chip 10 has verified its authenticity, authentication circuit 36 may transmit an unlock signal to interface 38 thereby unlocking interface 38 and allowing data to be transmitted therethrough.

In another embodiment, instead of or in addition to unlocking interface 38, authentication circuit 36 may also send an unlock signal to memory region 40, thereby unlocking memory region 40 and allowing data to be read therefrom.

At block S510 (FIG. 5B), authentication circuit 36 reads chip data from memory of chip 10 (e.g., from memory region 40), and at block S512, authentication circuit 36 transmits this chip data to a chip reader (e.g., terminal 14) by way of interface 38. When chip 10 is included in payment card 12, this chip data may be payment card account data for conducting a payment card transaction.

Once this chip data has been transmitted to the chip reader, operations at chip 10 may cease until self-authentication needs to be performed once again. If interface 38 was unlocked at block S508, then it may again be locked by sending a lock signal from authentication circuit 36. Similarly, if memory region 40 was unlocked at block S508, then it may again be locked by sending a lock signal from authentication circuit 36.

As noted, in some embodiments, authentication circuit 36 may also include logic for performing network authentication in cooperation with a remote server such as server 16. In particular, network authentication is performed by comparing a network authentication code stored at chip 10 with a network authentication code stored at server 16, and chip 10 is verified to be authentic only if the codes match. The network authentication codes stored respectively at chip 10 and at server 16 may be identical or matched according to a defined relationship (e.g., a hash function).

The network authentication codes stored at chip 10 and server 16 may be changed from time to time. Conveniently, updating the network authentication codes from time to time ensures that, in the event that a network authentication code is copied to a counterfeit card, that network authentication code may only be used to successfully complete network authentication for a limited time, e.g., until the network authentication code changes.

The network authentication codes stored at chip 10 and server 16 may be updated synchronously. For example, in some embodiments, the codes may be updated at predetermined time intervals (e.g., every 30 minutes). These codes are changed in such a way that they remain matching after each change. For example, the network authentication codes may be changed at chip 10 and at server 16 according to a predetermined sequence, which may be a pseudo-random sequence, or according to a predetermined code-generation algorithm.

The network authentication codes may include, or be generated from, a current timestamp (e.g., indicating time and date). A device having a chip with a stale timestamp or sequence value may be readily identified as being a counterfeit.

The network authentication codes may be updated at chip 10 and server 16 each time card 12 is used in a transaction. So, the network authentication codes may include, or be generated using a transaction identifier that uniquely identifies each transaction. Of course, the network authentication codes may include, or be generated from both a network identifier and a timestamp.

Optionally, when network authentication is performed, the network authentication code at chip 10 may be allowed to deviate by a predefined margin from the network authentication code at server 16. For example, if the network authentication codes include timestamps, then the respective timestamps of the two network authentication codes may be allowed to deviate by a predefined time interval (e.g., 30 seconds, one minute, etc.). Similarly, if the network authentication codes include transaction identifiers, then the respective transaction identifiers of the two network authentication codes may be allowed to deviate by a predefined number of transactions. In this way, network authentication may be allowed to complete successfully even if the network authentication codes do not match exactly.

The operation of an embodiment of chip 10 that performs network authentication is further described with reference to the exemplary blocks shown in FIG. 5A and FIG. 5C. In this embodiment, the above initialization steps further include initializing chip 10 to perform network authentication before blocks S500 and onward are performed. In particular, chip 10 is initialized by writing an initial network authentication code to memory of chip 10.

This network authentication code may be written to memory region 40 of chip 10. In this case, the network authentication code may not be accessible until memory region 40 is unlocked following successful self-authentication. However, the network authentication code may also be written to another memory region in chip 10 (e.g., memory region 30) or memory that is external to chip 10 but accessible by chip 10.

The network authentication code stored in memory of chip 10 or accessible by chip 10 may be stored in encrypted form using any of the encryption techniques described above. In an embodiment, the chip authentication code described above may be used as the symmetric key for encrypting/decrypting the network authentication code at chip 10. Conveniently, this ensures that the network authentication code can only be decrypted using the chip authentication code, which as noted above, cannot be copied by would-be fraudsters.

Figure 5C:
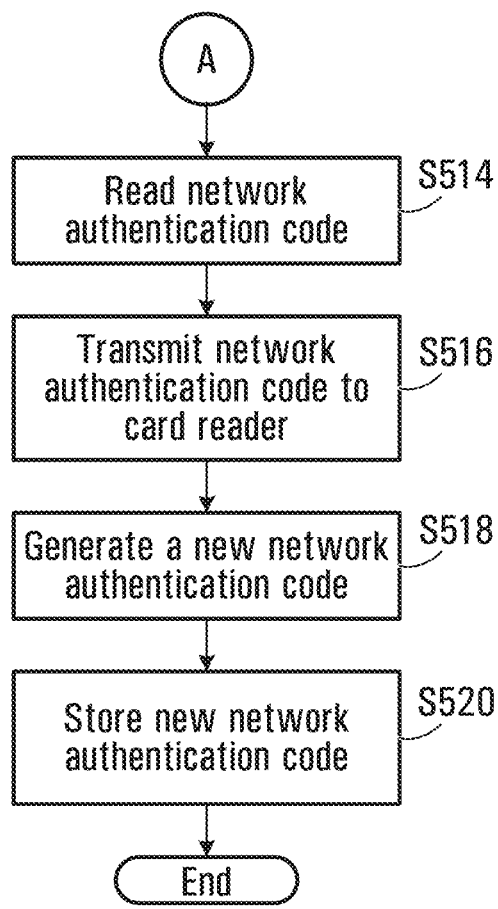

In this embodiment of FIG. 5A and FIG. 5C, self-authentication is performed, as depicted in FIG. 5A and detailed above. However, following successful self-authentication, network authentication operations are performed. In particular, at block S514, authentication circuit 36 reads the network authentication code from memory in chip 10 (e.g., memory region 40). Next, this network authentication code is sent by authentication circuit 36 to interface 38, which transmits the code to terminal 14.

Terminal 14 then relays the network authentication code of chip 10 to server 16, where it is compared against the network authentication code stored at server 16. Server 16 determines chip 10 to be authentic if the network authentication code of chip 10 matches the network authentication code of server 16. When chip 10 is included in card 12, if chip 10 is determined to be authentic, then card 12 is deemed to be authentic.

Along with the network authentication code, chip 10 may also transmit other data stored at the chip to terminal 14, for relay to server 16. For example, this other data may be a payment card account number required to conduct a transaction.

The network authentication code and other data stored at chip 10 may be transmitted to terminal 14 in encrypted form for relay to server 16. In this way, this code and data are protected from being copied at terminal 14 or during subsequent transmission to server 16. Chip 10 may additionally send a unique chip identifier to server 16 in unencrypted form to allow server 16 to select the appropriate decryption key.

After network authentication has been performed, chip 10 may update its network authentication code. In particular, at block S518, authentication circuit 36 generates a new network authentication code in manners described above, and at block S520, stores the new network authentication code, e.g., in memory 40. As noted above, the network authentication code may be stored in encrypted form. At this time, a new network authentication code is also generated and stored at server 16, to be used during a subsequent network authentication process.

When smart chip 10 updates its network authentication code while connected to an external power source (e.g., terminal 14 by way of contact pins 22), chip 10 may draw power from that external power source. When chip 10 updates the network authentication code at other times, it may draw power from an embedded power supply such as power supply 26 (FIG. 3C).

Optionally, following self-authentication, chip 10 may also perform a user authentication process. For example, the user may be prompted to enter a numeric code (i.e., secret PIN) by way of the keypad of terminal 14, which is then verified by smart chip 10.

Figure 6:
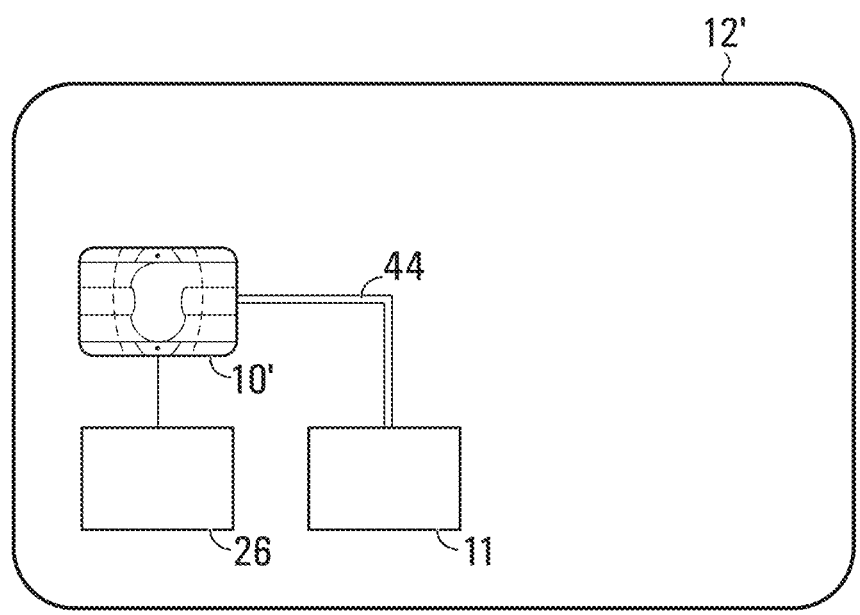
FIG. 6 is a schematic diagram of components of a card including a self-authenticating chip, exemplary of another embodiment.

FIG. 6 schematically illustrates the internal components of a card 12', exemplary of another embodiment. Card 12' is substantially similar to card 12, but includes a chip 10' instead of a chip 10. Card 12' further includes a second chip 11 interconnected with chip 10' by way of data connection 44, allowing data to be transmitted therebetween. Like card 12, card 12' may optionally include an embedded power supply 26.

Connection 44 may be formed using suitable nanotechnologies, e.g., using conductive carbon nanowires. Conveniently, as will be appreciated, carbon nanowires may be smaller and/or lighter than conventional conductors. Further, carbon nanowires may exhibit improved durability, improved thermal stability, and higher magnetic coercivity compared to conventional conductors.

Chip 10' is substantially similar to chip 10, aside from the differences described herein. In particular, as detailed below, chip 10' cooperates with chip 11 to perform self-authentication. Chip 10' may also cooperate with chip 11 to perform network authentication in conjunction with a network-interconnected server such as server 16.

Chip 11 may be a conventional smart chip, such as, for example, a Siemens SLE4442 chip, and includes logic adapting it to operate in manners detailed below. Unlike chip 10', which has contact pins exposed to the exterior of card 12', chip 11 may be substantially sealed within card 12'. Conveniently, this protects chip 11 from physical contact with a chip reader and may improve security against possible tampering or unauthorized access to data stored in chip 11. Chip 11 may be adapted to communicate only with chip 10, in response to communication initiated by chip 10. Thus, chip 11 may ignore communication originating from other sources, e.g., a merchant POS terminal.

Figure 7:
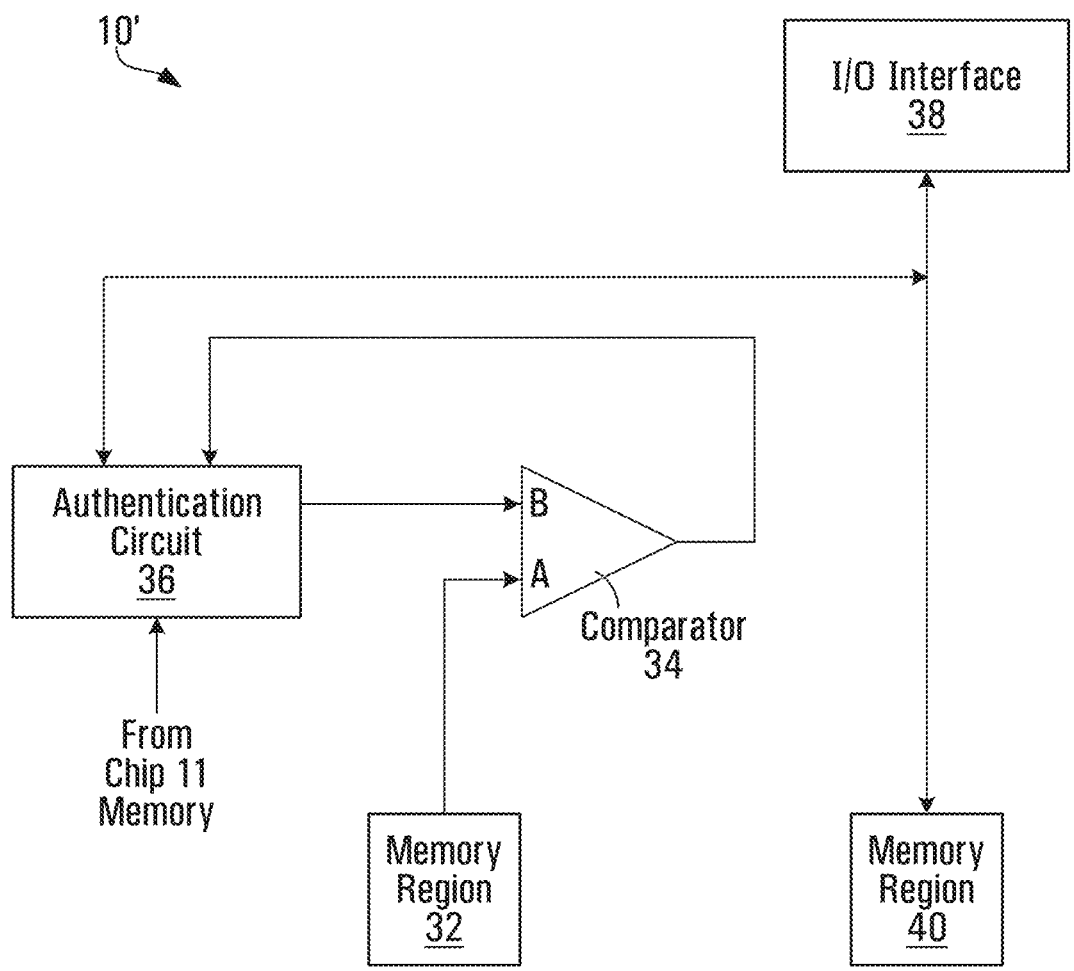
FIG. 7 is a simplified block diagram of the chip of FIG. 6.

FIG. 7 is a simplified block diagram of chip 10', exemplary of an embodiment. As depicted, chip 10', like chip 10, also includes a protected memory region 32 storing a chip authentication code, a comparator 34 allowing given input to be compared to the chip authentication code stored in protected memory region 32, an authentication circuit 36 that includes logic for performing authentication operations, an I/O interface 38 that allows chip 10' to communicate with a chip reader, and optionally, a memory region 40 that stores data to be provided to a chip reader.

Unlike chip 10, chip 10' does not include a memory region 30 interconnected with authentication circuit 36 that stores a second chip authentication code for comparison with the first chip authentication code stored in protected memory region 32. The second chip authentication code is instead stored in a memory of chip 11, and this memory of chip 11 is interconnected with authentication circuit 36 such that the second chip authentication code may be read therefrom by authentication circuit 36.

Authentication circuit 36 presents the second chip authentication code read from chip 11 to input B of comparator 34. Comparator 34 compares the second chip authentication code to the first chip authentication code stored in memory region 32 and presented at input A of comparator 34. Comparator 34 outputs a binary indicator of whether these two chip authentication codes match. Thus, chips 10' and 11 cooperate to perform the blocks shown in FIG. 5A and FIG. 5B to verify that that the chips are authentic, and that card 12' is authentic.

Optionally, chip 10' may also perform network authentication as shown in FIG. 5C in substantially the same manner as described above. However, the network authentication code to be sent to server 16 may be read from a memory of chip 11, and may be updated by authentication circuit 36 by writing a new network authentication code to memory of chip 11.

In another embodiment, one or more of memory region 32, comparator 34, and authentication circuit 36 may be moved from chip 10' to chip 11. Since chip 11 is substantially sealed within card 12', moving components from chip 10' to chip 11 may improve security against possible tampering or unauthorized access.

Figure 8:
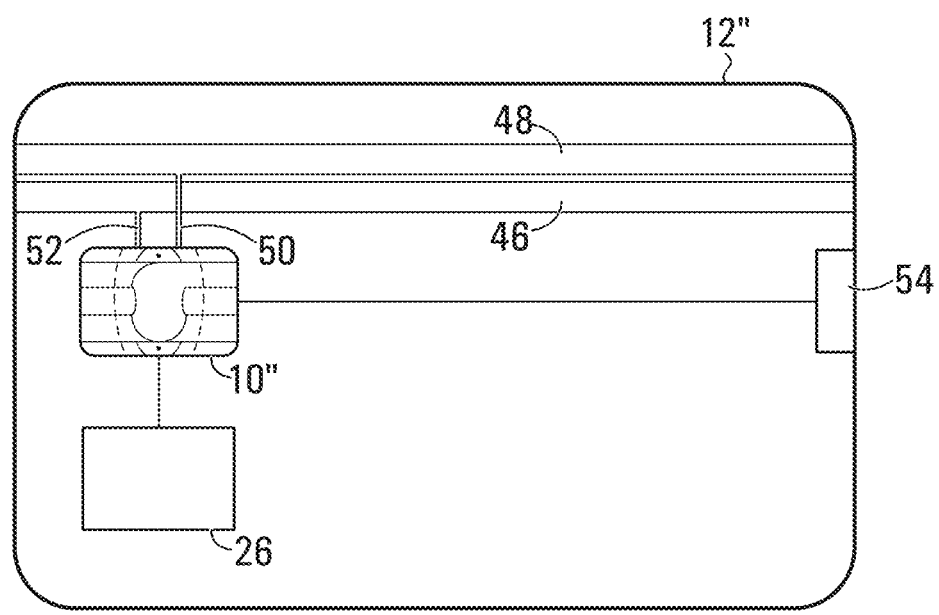
FIG. 8 is a schematic diagram of components of a card including a self-authenticating chip, exemplary of yet another embodiment.

FIG. 8 schematically illustrates the internal components of a card 12", exemplary of yet another embodiment. Card 12" is substantially similar to card 12, but includes a chip 10" instead of a chip 10. Card 12" further includes components allowing chip 10" to read and write to magnetic stripe 24. In particular, card 12" further includes a write circuit 46 interconnected to chip 10" by way of data connection 52, allowing chip 10" to write data to at least part of magnetic stripe 24, and a read circuit 48 interconnected to chip 10" by way of a data connection 50, allowing chip 10" to read from at least part of magnetic stripe 24. Card 12" may also include a swipe detector 36 that detects when the card has been swiped through a magnetic stripe reader (e.g., of merchant POS terminal 14). Like card 12, card 12" may optionally include an embedded power supply 26.

Write circuit 46 includes at least one write head that operates under control of chip 10" to set the magnetic state of particular bit positions of magnetic stripe 24. Each write head may include a magnetic transducer that converts a signal from chip 10" to magnetic energy to set the state of magnetic domains at one or more bit positions of magnetic stripe 24, thereby storing a value of 0 or 1 at each of those bit positions. In an embodiment, multiple write heads may be arranged in an array along the magnetic stripe 24 to write to respective bit positions along the stripe. In some embodiments, write circuit 46 may include write heads as described in U.S. Pat. No. 7,044,394 to Brown. In other embodiments, write circuit 46 may include write heads formed as an array or a multi-dimensional matrix of conductors, as described in, e.g., International Patent Publication WO 2004/095169 to Osterweil or U.S. Pat. No. 7,591,427 to Osterweil. The array/matrix of conductors may be embedded in card 12" proximate magnetic stripe 24.

Data written to magnetic stripe 24 may be read by chip 10" by way of read circuit 48, as detailed below, or by a magnetic stripe reader (e.g., of merchant POS terminal 14) upon swiping card 12" through the reader.

Read circuit 48 includes at least one read head that operates under control of chip 10" to read the magnetic state of particular bit positions of magnetic stripe 24. Each read head may include a sensor that senses the state of magnetic domains at one or more bit positions of magnetic stripe 24 and generates a signal representative of that state (e.g., indicating a value of 0 or 1 for a particular bit position). In an embodiment, multiple read heads may be arranged in an array along magnetic stripe 24 to read from respective bit positions along the stripe. In some embodiments, read circuit 48 may include read heads that sense the magnetic state of particular bit positions using fluxgate sensors, e.g., as described in U.S. Pat. No. 7,591,427 to Osterweil.

In some embodiments, a single circuit may be used for both reading and writing. For example, this circuit may include write-heads adapted to also read from a magnetic stripe, or read-heads adapted to also write to a magnetic stripe.

Given the relative thinness of card 12" in some embodiments, one or both of write circuit 46, read circuit 48, and data connections 50 and 52 may be formed using suitable nanotechnologies, e.g., using conductive carbon nanowires.

Swipe detector 54 detects when card 12" has been swiped through a magnetic stripe reader (e.g., of terminal 14). In some embodiments, swipe detector 54 includes a pressure sensor to detect pressure applied to card 12" when it is swiped through a merchant POS terminal. In other embodiments, swipe detector 54 includes a sensor that detects the electromagnetic signature of magnetic stripe reader, e.g., of the reader's read heads. In some embodiments, swipe detector 54 includes read-head detectors as described in U.S. Patent Publication 2012/0318871 to Mullen et al.

Figure 9:
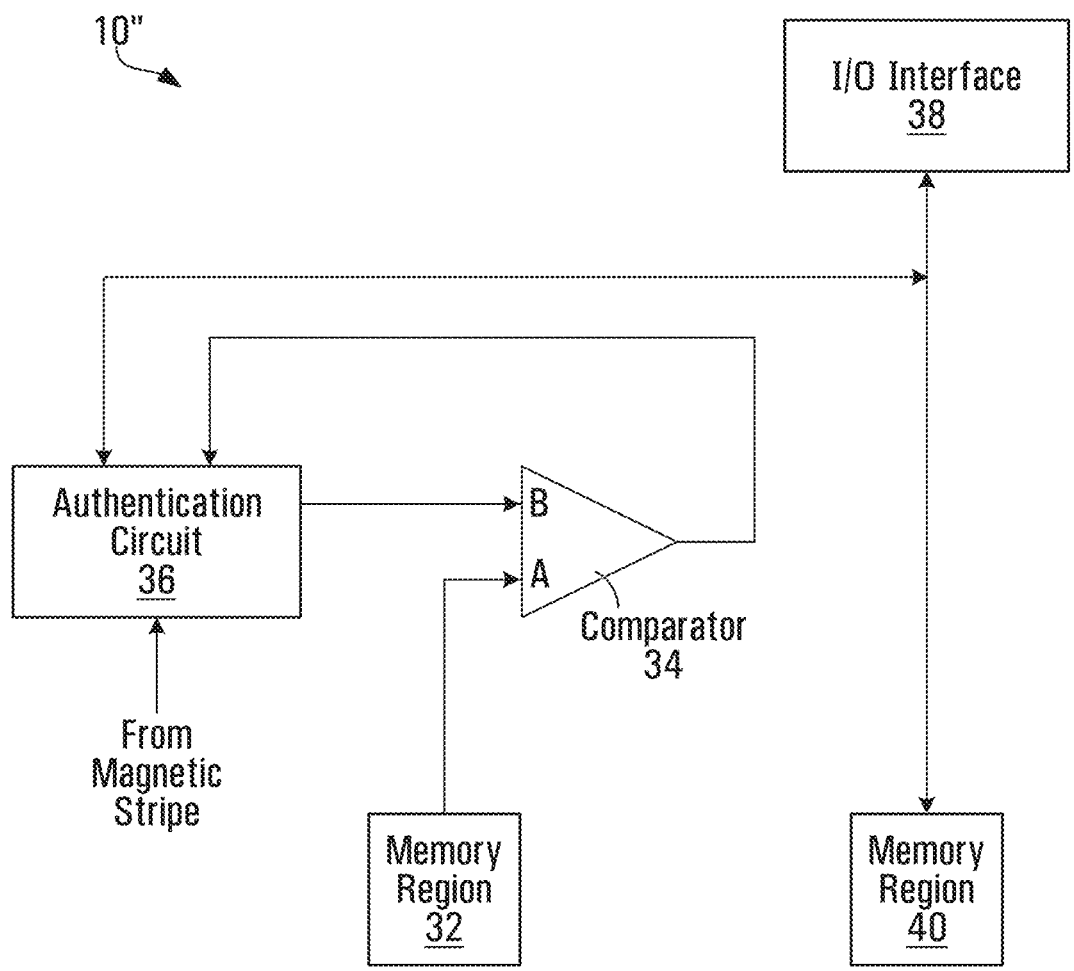
FIG. 9 is a simplified block diagram of the chip of FIG. 8.

FIG. 9 is a simplified block diagram of chip 10", exemplary of an embodiment. As depicted, chip 10", like chip 10, also includes a protected memory region 32 storing a chip authentication code, a comparator 34 allowing given input to be compared to the chip authentication code stored in protected memory region 32, an authentication circuit 36 that includes logic to control chip 10" to perform authentication operations, an I/O interface 38 that allows chip 10" to communicate with a chip reader, and optionally, a memory region 40 that stores data to be provided to a chip reader.

Unlike chip 10, chip 10" does not include a memory region 30 interconnected with authentication circuit 36 that stores a second chip authentication code for comparison with the first chip authentication code stored in protected memory region 32. The second chip authentication code is instead stored on magnetic stripe 24, and is read therefrom by authentication circuit 36 by way of read circuit 48.

Authentication circuit 36 presents the second chip authentication code read from the magnetic stripe 24 to input B of comparator 34. Comparator 34 compares this second chip authentication code to the first chip authentication code stored in memory region 32 and presented at input A of comparator 34. Comparator 34 outputs a binary indicator of whether these two chip authentication codes match. Thus, chip 10" performs the blocks shown in FIG. 5A and FIG. 5B to verify that that the chip is authentic, and that card 12' is authentic.

Optionally, chip 10' may also perform network authentication as shown in FIG. 5C in substantially the same manner as described above. However, the network authentication code to be sent to server 16 may be read from magnetic stripe 24 by way of read circuit 48, and may be updated by authentication circuit 36 by writing a new network authentication code to magnetic stripe 24 by way of write circuit 46.

Conveniently, storing a network authentication code on magnetic stripe 24 provides for compatibility with merchant POS terminals that are unable to communicate with chip 10" but are able to read from magnetic stripe 24. In particular, the network authentication code may be read by the merchant POS terminal when card 12" is swiped through the terminal, and the code may then be passed to server 16 to perform network authentication.

When card 12" is used to conduct a transaction in conjunction with a merchant POS terminal that reads from magnetic stripe 24 without communicating with chip 10", chip 10" relies on a signal from swipe detector 54 indicating that card 12" has been swiped through a merchant POS terminal. In response, chip 10" may update the network authentication code in manners described above, e.g., by generating a new network authentication code and writing this new code to magnetic stripe 24 by way of write circuit 46.

In contrast to a conventional payment card that stores card data (e.g., a credit/debit card account number, expiry date, etc.) on track 1 and track 2 of its magnetic stripe while leaving track 3 unused, in the embodiment depicted in FIG. 8, the chip authentication code and the network authentication code on magnetic stripe 24 are stored on track 3. In some embodiments, track 1 and track 2 of magnetic stripe 24 may continue to store card data in a conventional way. In other embodiments, track 1 and track 2 of magnetic stripe 24 may simply be left unused (blank), and card data may be stored on track 3 of magnetic stripe 24 instead. Any card data stored on track 3 of magnetic stripe 24 may be in encrypted form. Conveniently, conventional merchant POS terminals may be adapted to read from track 3 by updating its software/firmware, while avoiding any hardware changes.

As the first and second chip authentication code are stored at two separate locations on card 12', any counterfeit copy of card 12' that replicates the data of only one of these locations would not be able to successfully perform self-authentication. For example, a counterfeit copy of card 12' that only replicates the contents of magnetic stripe 24 would not be able to successfully perform self-authentication.

Figure 10:
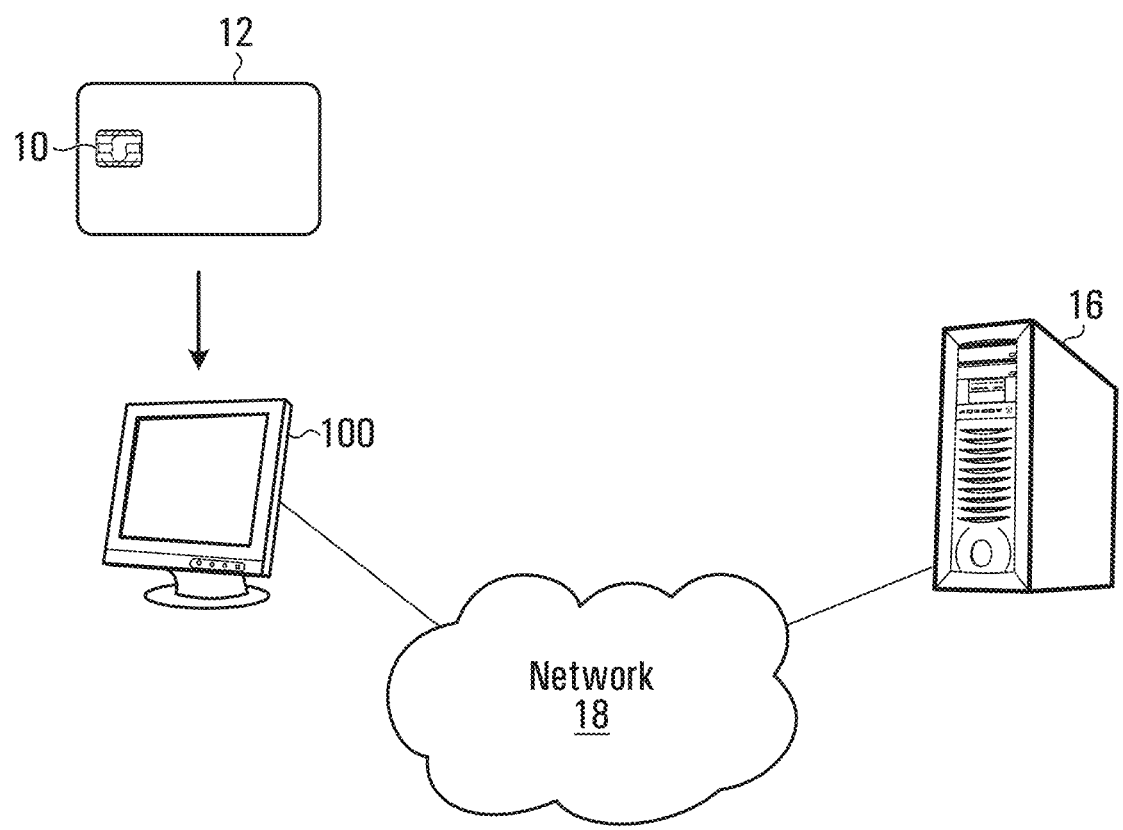
FIG. 10 is a network diagram illustrating a data communication network interconnecting a computing device and a remote server, and the payment card of FIG. 2, exemplary of another embodiment.

FIG. 10 depicts payment card 12 including self-authenticating chip 10, presented to a computing device 100 to conduct an e-commerce transaction with a merchant, exemplary of an embodiment. In this embodiment, the above-discussed self-authentication and network authentication operations are both performed. Conveniently, network authentication may be performed and the transaction may be conducted in the absence of a merchant POS terminal, e.g., when card 12 is used in the card bearer's home.

An exemplary computing device 100 is shown. Computing device 100 may be a device such as a desktop personal computer, a laptop computing device, a network computing device, a tablet computer, a personal digital assistant, a mobile phone, a smart television device, a video gaming console device, or the like, adapted to operate in the manner discussed below.

Figure 11:
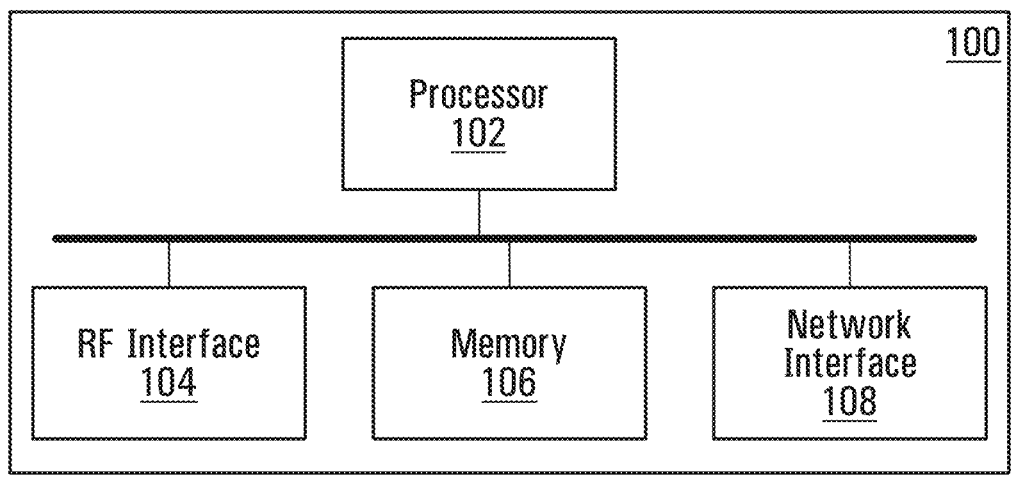
FIG. 11 is a high-level block diagram of the computing device of FIG. 10.

As shown in the high-level block diagram of FIG. 11, computing device 100 includes at least one processor 102 and memory 106 in communication with processor 102. Memory 106 stores software code, that when executed by processor 102, causes computing device 100 to conduct a payment card transaction (e.g., a credit/debit card transaction) in cooperation with card 12 and server 16.

As depicted, computing device 100 also includes RF interface 104 that allows device 100 to communicate with chip 10 of card 12 by way of RF communication. In some embodiments, RF interface 104 includes a peripheral communication port (e.g., Universal Serial Bus, IEEE 1394, serial, parallel, or the like) that allows an RF transmitter and an RF receiver to be removably attached to computing device 100. In other embodiments, RF interface 104 may include an integral RF transmitter and RF receiver, e.g., where computing device 100 is a mobile phone or a tablet computer. In some embodiments, computing device 100 may communicate with chip 10 by way of RF interface 104 using the NFC protocol.

As depicted, computing device 100 also includes a network interface that allows device 100 to communicate with network-connected devices (e.g., server 16) by way of data network 18. Computing devices 100 typically store and execute network-aware operating systems including protocol stacks, such as a TCP/IP stack. Computing device 100 may also store and execute web browsers such as Microsoft Internet Explorer, Mozilla Firefox, Google Chrome, Apple Safari, or the like, to allow the bearer of card 12 to conduct web-based payment card transactions.

Figure 12:
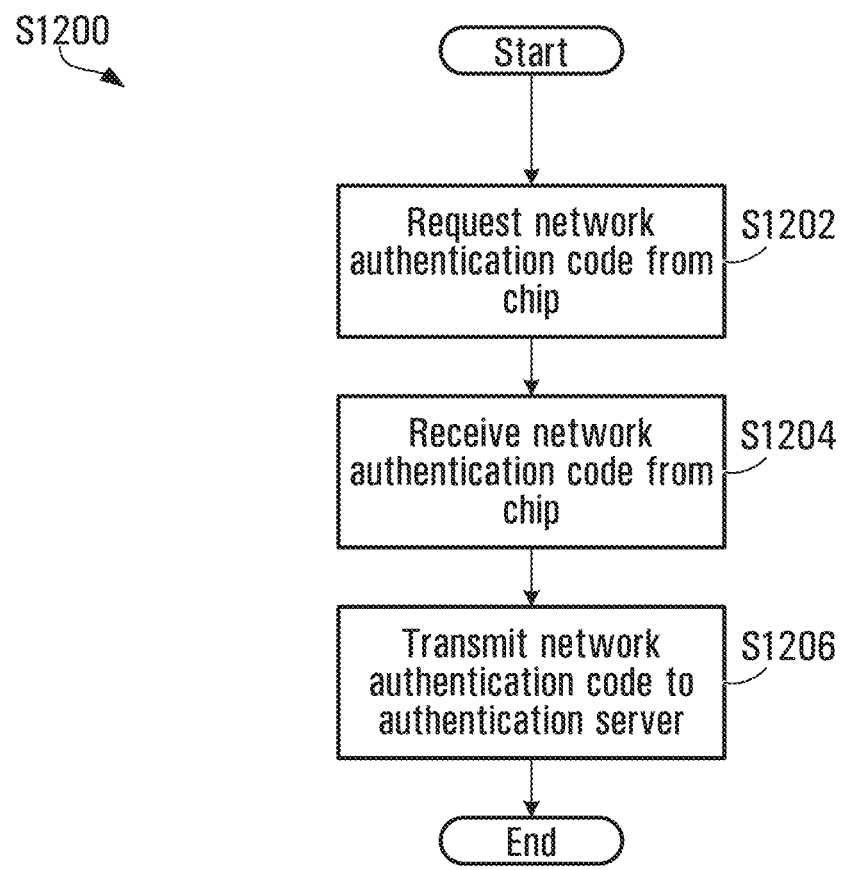
FIG. 12 is a flowchart depicting exemplary blocks performed by the computing device of FIG. 10.

The operation of computing device 100 is further described with reference to FIG. 12, which depicts exemplary blocks performed by computing device 100 to conduct a payment card transaction. A transaction is initiated by a user (e.g., the bearer of card 12) operating computing device 100, for example, with a remote merchant by way of a web site operated by that merchant. Computing device 100 then performs blocks S1200 and onward.

At block S1202, computing device 100 transmits a signal by way of RF interface 104 to chip 10 indicating that a transaction has been initiated and requesting that chip 10 provide its network authentication code. Upon receiving this signal, chip 10 performs the authentication operations depicted in FIG. 5A and FIG. 5C, as discussed above, including the self-authentication operation discussed above.

Chip 10 may refuse to provide the requested network authentication code if self-authentication fails, in which case the transaction is terminated. However, if self-authentication is performed successfully, at block 1204, computing device 100 receives a network authentication code from chip 10 by way of RF interface 104. At block 1206, computing device 100 transmits the received network authentication code to server 16 by way of network interface 108.

Computing device 100 may also transmit any additional card data (e.g., a credit/debit card account number) received from chip 10 to server 16. When data is received from chip 10 in encrypted form, computing device 100 may relay it to server 16 without decrypting that data.

Server 16 performs network authentication using the network authentication code relayed by computing device 100, in manners described herein. Upon performing network authentication, server 16 may authorize or reject the transaction.

As will be appreciated, cards 12' and 12" may also be used to conduct transactions by way of computing device 100, in substantially the same manner as card 12.

Figure 13:
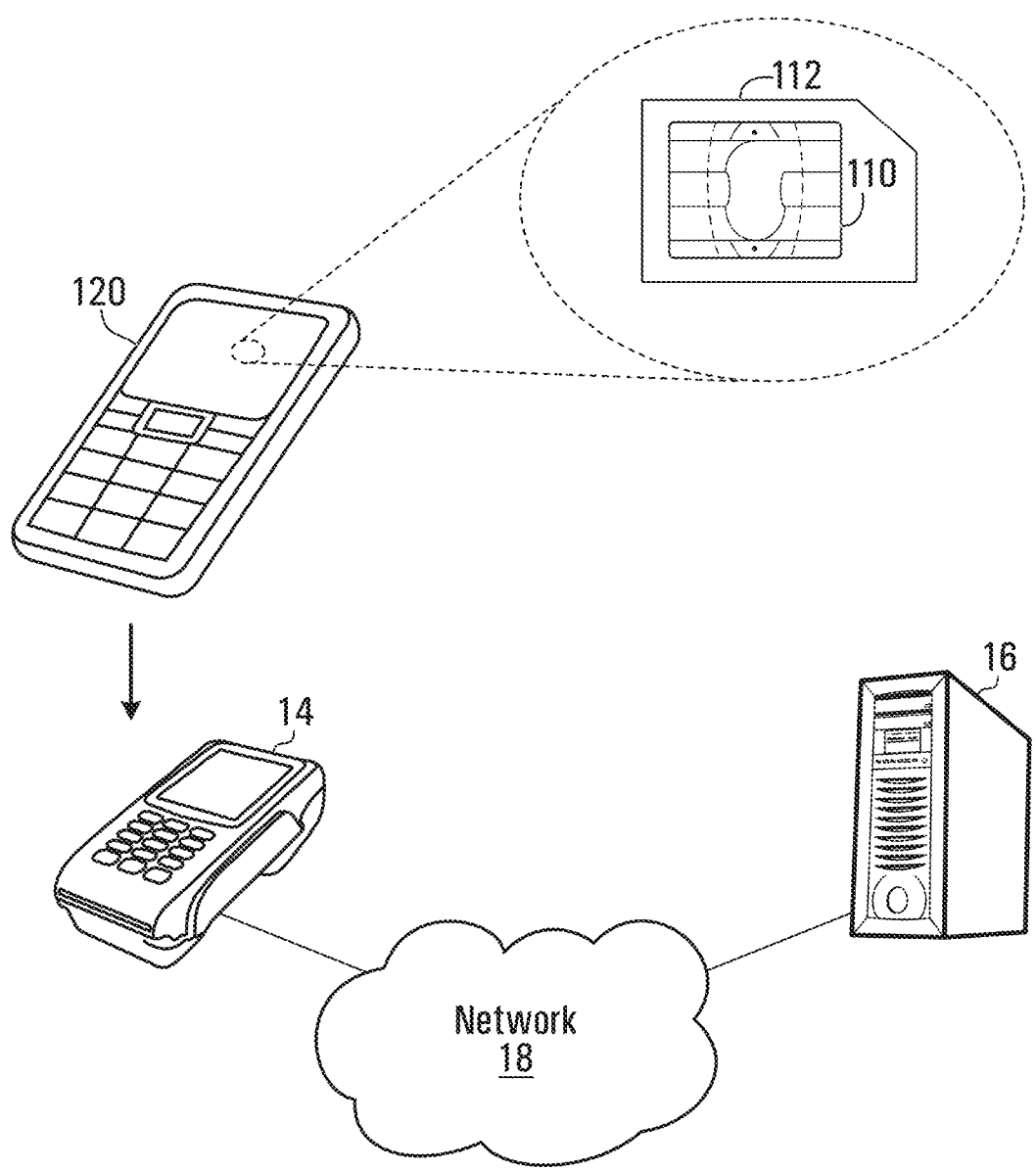
FIG. 13 is a network diagram illustrating a data communication network interconnecting a merchant POS terminal and a remote server, and a mobile phone including a self-authenticating chip, exemplary of another embodiment.

A self-authenticating chip as disclosed herein may also be included in a SIM card. For example, FIG. 13 depicts a SIM card 112 including a chip 110. Chip 110 may be a conventional SIM chip that identifies a mobile service subscriber when used in a conventional mobile telephony device, but is adapted to also function in manners substantially similar to chip 10. For example, in some embodiments, chip 110 may be a conventional SIM chip having at least 64 kilobytes of memory, capable of executing a conventional SIM Virtual Machine, and including or modified to include a protected memory region 32.

As such, chip 110 performs self-authentication in manners described above for chip 10 to verify its authenticity. For example, chip 110 may verify its own authenticity before it provides subscriber identity data, such as an international mobile subscriber identity (IMSI) code to a mobile service provider server to gain access to mobile network resources. In particular, chip 110 may perform blocks S500 and onward as depicted in FIG. 5A and FIG. 5B. Once chip 110 has verified its authenticity, subscriber identity data (e.g., an IMSI code) is transmitted to a mobile telephony device for relay to a mobile service provider server at block S512.

Chip 110 may also verify its own authenticity each time particular mobile network resources are requested, e.g., each time that a call is placed, or a Short Message Service (SMS) message is sent. Thus, a counterfeit SIM card may be prevented from accessing mobile network sources.

Optionally, chip 110 may also perform network authentication in manners described above for chip 10 and depicted in FIG. 5C, in cooperation with a mobile service provider server.

In some embodiments, chip 110 may be further adapted to include functionality of a conventional payment card smart chip. In particular, chip 110 may store in its memory payment card account data to conduct transactions, and may be adapted to communicate with an RF transmitter to conduct transactions with a merchant POS terminal, e.g., using the NFC protocol. In such embodiments, chip 110 may be a conventional RF-enabled SIM chip, which may be modified to include a protected memory region 32, and adapted to function in manner substantially similar to chip 10. Exemplary conventional RF-enabled RIM chips that could be used include, for example, SIM Model Nos. SGSIMRFA01, SGEMVSIM01, SGSIMNFC01, 15350F0, SGNFCSIM08, provided by Shenzhen Sunshine Good Electronic Company Limited (China); and Hengbao RF-SIM chips provided by Hengbao Co., Ltd. (Singapore).

Conveniently, adapting chip 110 to include functionality of a conventional payment card smart chip allows users to conduct payment transactions using a mobile telephony device including chip 110, in lieu of a conventional payment card (e.g., a credit card or a debit card).

Returning to FIG. 13, as depicted, chip 110 is included in SIM card 112 of mobile phone 120. Mobile phone 120 is presented to merchant POS terminal 14 to conduct a transaction (e.g., a credit card or debit card transaction) by way of RF communication. Presenting mobile phone 120 to terminal 14 causes chip 110 to perform authentication operations, namely, self-authentication, and optionally, network authentication as described above with reference to FIGS. 5A-C. Chip 110 transmits payment card account data stored in its memory to terminal 14 only upon successfully verifying its authenticity.

As will be appreciated, mobile phone 120 including chip 110 may also be used to conduct transactions by way of computing device 100 (FIG. 10), in substantially the same manner as card 12.

In an embodiment, chip 110 in SIM card 112 may be adapted to transmit messages to a counterpart chip in the SIM card of another mobile telephony device. In this embodiment, chip 110 may verify its authenticity before sending such messages.

Optionally, chip 110 in SIM card 112 may store authentication codes for one or more counterpart chips in other SIM cards, e.g., authentication codes for chips in other SIM cards used by contacts of the user of SIM card 112. Such authentication codes may, for example, be serial numbers assigned to each of those SIM cards. Chip 110 may use the stored authentication codes to verify the authenticity of a counterpart chip in another SIM card when a message is received from that chip. For example, when an incoming message is received by chip 110 from a given chip and the message includes an authentication code, chip 110 may compare the received authentication code with its stored authentication code for the given chip. If the codes match, then the given chip is verified to be authentic. Similarly, chip 110 may store its own authentication code, and may transmit this code to counterpart chips to allow those chips to verify the authenticity of chip 110.

Chip 110 may also be adapted to perform self-authentication and/or network authentication in manners described above upon request from a software application executing at mobile phone 120. For example, a mobile ticketing software application executing at mobile phone 120 may request that chip 110 verify its authenticity before providing an electronic ticket number to a ticket check station. A retailer's software application executing at mobile phone 120 may request that chip 110 verify its authenticity before providing a voucher code or a coupon code to a checkout station. A mobile money transfer software application executing at mobile phone 120 may request that chip 110 verify its authenticity before allowing a money transfer to be sent or received.

In some embodiments, software application data (e.g., an electronic ticket number, a coupon code, a voucher code, or the like) may be provided to chip 110 and stored therein for later transmission to a chip reader. Of course, such data may be transmitted only after chip 110 verifies its authenticity.

SIM card 112 may be a GSM SIM card, a USIM card, a CSIM card, a R-UIM card, or a Universal Integrated Circuit Card, a high-capacity SIM card, a MegaSIM card, or the like.

In other embodiments, a self-authenticating chip as disclosed herein may be included in another type of card. For example, a self-authenticating chip may be included in an access card used to gain entry to a particular vehicle or a particular location (e.g., a building, a room, a garage, etc.). A self-authenticating chip may also be included in a public transportation card for gaining access to a public transportation service. A self-authenticating chip may also be included in an identity card, a membership card, a driver's license, a health care card, military personnel card, or the like. Conveniently, protecting against counterfeiting of such cards helps to prevent identity theft, unauthorized entry, and fraudulent access to services or funds.

Figure 14:
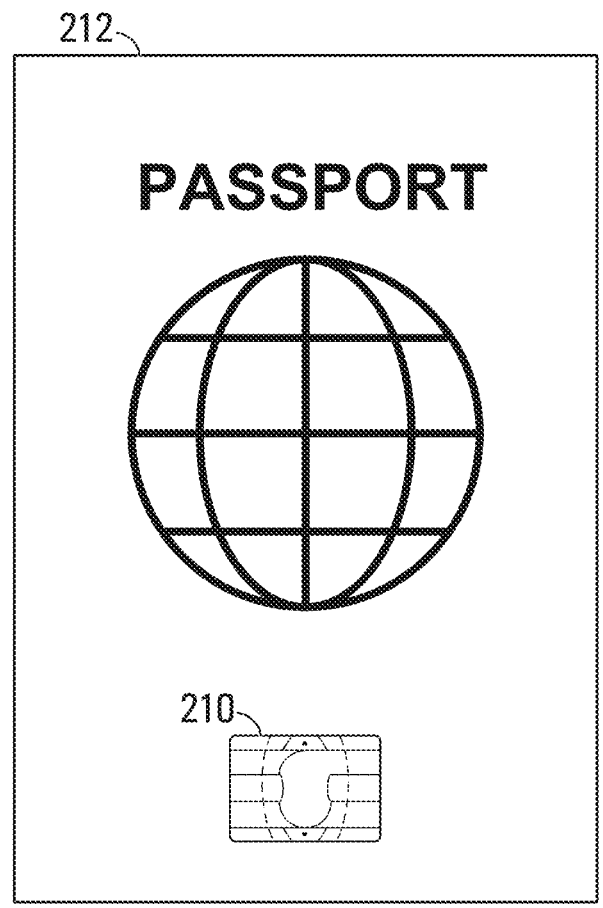
FIG. 14 is a front view of a passport document including a self-authenticating chip, exemplary of another embodiment.

In further embodiments, a self-authenticating chip as disclosed herein may be included in another type of device such as a document. For example, as depicted in FIG. 14, a self-authenticating chip 210 may be included in a passport 212. Chip 210 may perform authentication operations as described above, and provide passport data (e.g., the passport number, the passport holder's name) to a chip reader only upon verifying its authenticity. Similarly, a self-authenticating chip may be included in another type of document, such as a travel visa, a birth certificate, a diploma, or the like.

In yet further embodiments, a self-authenticating chip as disclosed herein may be included in network appliances such as a network router, a network switch, a modem, or the like, to perform authentication operations as described above before such gaining access to network resources. A self-authenticating chip as disclosed herein may also be included in television appliances such as a set-top box, a television, a Smart TV, or the like, to perform authentication operations as described above before gaining access to a television transmission.

In another embodiment, a self-authenticating chip as disclosed herein may be included in a motor vehicle to allow a payment transaction to be conducted in the absence of a payment card. When included in a motor vehicle, the chip may be used to pay for charges incurred in the course of operating the vehicle, e.g., for drive-through restaurants, drive-in theatres, car washes, road tolls, parking, refueling, or the like. In particular, the chip may pay for such charges by transmitting stored payment data (e.g., a payment card account number) to a POS terminal by way of RF communication. Of course, payment data may be transmitted from the chip only if it successfully verifies its authenticity upon performing self-authentication.

The self-authenticating chip may be interconnected to the power system of the vehicle to draw power therefrom. The chip may also be interconnected to a battery such as a long-lasting lithium battery or the like. Both the chip and the battery may be encased within a protective material such as epoxy or the like. To extend the range of RF communication, the chip may be connected to an antenna that extends along the vehicle body.

Conveniently, payments may be made automatically without manual intervention from either an occupant of the vehicle or a vendor. Of course, automatic payments may be governed by predefined rules, e.g., to allow payments in amounts below a specified limit, payments to specified vendor types, or payments to specified vendors. Payment rules may be stored in memory of the self-authenticating chip.

Payment may also be manually requested by a user, e.g., an occupant of the vehicle, by way of a user interface in communication with the self-authenticating chip. This user interface could be integral to the vehicle or mounted thereto. For example, it could be installed on the vehicle dashboard or steering wheel. The user interface could also be part of a separate computing device (e.g., a mobile phone) operated by an occupant of the vehicle.

The chip may also store data other than payment data, such as data reflective of vehicle registration, Vehicle Identification Numbers (e.g., chassis and engine numbers), manufacturer's information, a driver's license, or insurance information. Such data may be transmitted by the chip by way of RF communication in response to an inquiry, e.g., from a device operated by law enforcement, border control, or the like. The chip may perform self-authentication before transmitting such data.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A self-authenticating integrated circuit chip comprising:
a first memory region storing a first authentication code, in encrypted form;
a second memory region storing a second authentication code;
a comparator circuit on the integrated circuit chip interconnected to at least said second memory region for providing an indicator of whether a given input to said comparator circuit matches said second authentication code stored in said second memory region;
wherein said second authentication code within said second memory region cannot be extracted or modified by said integrated circuit chip or a chip reader and may only be accessed by said comparator to compare the given input to said comparator circuit to said second authentication code; and
an authentication circuit on the integrated circuit chip interconnected to said comparator circuit and at least one of said memory regions wherein said authentication circuit is operable to:
read said first authentication code in encrypted form from said first memory region;
decrypt said first authentication code;
present said first authentication code as decrypted to said comparator circuit; and
in response to receiving an indicator from said comparator indicating that said first authentication code as decrypted matches said second authentication code
unlock a communication interface of said integrated circuit chip to allow data to be transmitted therethrough to a chip reader or unlock a third memory region of the integrated circuit chip.

2. The chip of claim 1, wherein said communication interface comprises a radio-frequency transmitter.

3. The chip of claim 1, wherein said integrated circuit chip is operable, upon said unlocking, to transmit data to a chip reader by way of said communication interface.

4. The chip of claim 3, wherein said transmitted data is transmitted in encrypted form.

5. The chip of claim 3, wherein said transmitted data comprises at least one of a unique identifier of said integrated circuit chip, a unique user identifier, a unique account identifier, a unique mobile service subscriber identifier, a unique transaction identifier, an electronic ticket identifier, a voucher code, and a network authentication code.

6. The chip of claim 5, wherein said unique account identifier comprises a credit card number or a debit card number.

7. The chip of claim 5, wherein said network authentication code comprises at least one of a timestamp and a transaction identifier.

8. The chip of claim 5, wherein said authentication circuit is further operable to update said network authentication code at pre-defined time intervals.

9. The chip of claim 1, wherein said self-authenticating integrated circuit chip forms part of a document.

10. The chip of claim 9, wherein said document is a passport or a travel visa.

11. The chip of claim 1, wherein said self-authenticating integrated circuit chip forms part of a mobile phone, a tablet, a computer, a set-top box, a television, a Smart TV, a modern, a network switch, or a network router.

12. A mobile device comprising:
a receiver for receiving a first authentication code from a complementary device;
a self-authenticating integrated circuit comprising:
a first memory region storing said first authentication code, in encrypted form;
a second memory region storing a second authentication code;
a comparator circuit on the integrated circuit interconnected to at least said second memory region for providing an indicator of whether a given input to said comparator circuit matches said second authentication code stored in said second memory region;
wherein said second authentication code within said second memory region cannot be extracted or modified by said integrated circuit or a chip reader and may only be accessed by said comparator to compare the given input to said comparator to said second authentication code; and
an authentication circuit on the integrated circuit interconnected to said comparator and at least one of said one or more memory circuits wherein said authentication circuit is operable to receive:
read said first authentication code from said first memory region;
present said first authentication code as decrypted to said comparator; and
in response to receiving an indicator from said comparator indicating that said first authentication code matches said second authentication code unlock said integrated circuit to allow data to be exchanged in said complementary device.

13. The mobile device of claim 12, wherein said receiver comprises a radio-frequency receiver.

14. The mobile device of claim 12, wherein said complementary device comprises a second mobile device.

15. The mobile device of claim 12, further comprising memory storing an authentication code to be transmitted to a further complementary device.

16. The mobile device of claim 12, wherein said self-authenticating integrated circuit is part of a Subscriber Identification Module (SIM).

* * * * *